US010759398B2

(12) United States Patent
Crow (10) Patent No.: US 10,759,398 B2
(45) Date of Patent: Sep. 1, 2020

(54) INTEGRATED BREAKAWAY BRAKE SYSTEM (71) Applicant: CONTINENTAL BATTERY COMPANY, Dallas, TX (US)

(72) Inventor: Steve Crow, Wylie, TX (US)

(73) Assignee: CONTINENTAL BATTERY COMPANY, Dallas, TX (US)

( * ) Notice: Subject to any disclaimer, the term of this patent is extended or adjusted under 35 U.S.C. 154(b) by 0 days.

(21) Appl. No.: 15/889,277

(22) Filed: Feb. 6, 2018

(65) Prior Publication Data
US 2018/0222454 A1 Aug. 9, 2018

Related U.S. Application Data (60) Provisional application No. 62/456,333, filed on Feb. 8, 2017.

(51) Int. Cl.
B60T 7/20 (2006.01)
B60R 16/02 (2006.01)
(Continued)

(52) U.S. Cl.
CPC ............ B60T 7/20 (2013.01); B60R 16/0207 (2013.01); B60R 16/033 (2013.01);
(Continued)

(58) Field of Classification Search
CPC ..... B60T 7/20; B60R 16/0207; B60R 16/033; H01R 13/713; H01R 27/04; H01R 2231/026
See application file for complete search history.

(56) References Cited

U.S. PATENT DOCUMENTS 3,951,464 A * 4/1976 Donahue ................. B60T 13/58
303/7
4,052,695 A * 10/1977 Myers ...................... B60Q 1/44
188/3 R
(Continued)

OTHER PUBLICATIONS

"BrakeRite II SD", Actuator Catalog, vol. 1, Feb. 2017.
(Continued)

Primary Examiner — Bradley T King
(74) Attorney, Agent, or Firm — Greenberg Traurig, LLP (57) ABSTRACT An integrated system for engaging electric brakes of a towed vehicle when the towed vehicle separates from a towing vehicle, comprising a power source, a first junction pole configured to be connected with an electric ground, a second junction pole configured to be connected with the electric brakes of the towed vehicle, an electrical connector connecting the first junction pole with the power source, a breakaway switch, and a housing containing the power source, first and second junction poles, and the electrical connector. The electrical connector includes a first end fixedly connected with the first junction pole and the breakaway switch includes an electrical connector fixedly connected to the second junction pole. Another integrated system further housing the breakaway switch and comprising fixed connections between the first junction pole and the power source, the second junction pole and the breakaway switch, and the breakaway switch and the power source.

28 Claims, 7 Drawing Sheets (51) Int. Cl.
*B60R 16/033* (2006.01)
*H01R 13/713* (2006.01)
*B60T 13/74* (2006.01)
*H01H 27/04* (2006.01)

(52) U.S. Cl.
CPC .......... *B60T 13/741* (2013.01); *H01R 13/713* (2013.01); *H01H 27/04* (2013.01); *H01H 2231/026* (2013.01)

(56) References Cited

U.S. PATENT DOCUMENTS

| | | | |
|---|---|---|---|
| 4,066,996 A | 1/1978 | Davis | |
| 6,364,432 B1 | 4/2002 | Mixon | |
| 6,652,038 B1 * | 11/2003 | Frye | B60T 7/20 303/7 |
| 6,802,572 B2 | 10/2004 | Lamke et al. | |
| 6,837,551 B2 * | 1/2005 | Robinson | B60T 7/10 303/7 |
| 9,315,173 B1 | 4/2016 | Gray et al. | |
| 2004/0160116 A1 | 8/2004 | Gray | |
| 2007/0171031 A1 | 7/2007 | Hastings | |
| 2010/0320040 A1 * | 12/2010 | Anderson | B60T 7/20 188/112 R |
| 2013/0264863 A1 * | 10/2013 | McCollum | B60Q 11/00 307/9.1 |
| 2015/0306928 A1 * | 10/2015 | McCollum | B60T 13/662 340/431 |
| 2016/0167630 A1 * | 6/2016 | Wolf | B60T 7/20 188/158 |
| 2018/0148019 A1 * | 5/2018 | Graham | B60T 7/107 |

OTHER PUBLICATIONS

"Titan BrakeRite Plug and Play Electric/Hydraulic Actuator Kit", Feb. 2017. <www.easternmarine.com>.

"Tekonsha Push to Test Breakaway Kit with Premium Integrated Charger", Feb. 2017. <www.etrailer.com>.

* cited by examiner

INTEGRATED BREAKAWAY BRAKE SYSTEM

CROSS REFERENCE TO RELATED APPLICATION

This application claims priority to U.S. Provisional Patent Application No. 62/456,333, filed on Feb. 8, 2017, which is hereby incorporated by reference for all purposes.

BACKGROUND

Existing breakaway switch kits suffer from a number of disadvantages. Many come in pieces that must be separately mounted to a towed vehicle, and further require the user to make manual wiring connections, often including splicing wires. These mounting and wiring tasks can be complicated, thereby increasing the time and difficulty of installation, as well as introducing potential safety and reliability issues. User error in making these connections could lead to the breakaway kit not functioning as intended, as well as the potential for creating a short circuit or other effect that damages or destroys the breakaway kit and/or the power source. Further, it can be cumbersome to make wiring connections, as wires from the towing vehicle and/or the towed vehicle can tend to jump off of junction box poles or other connectors when the fastener (e.g., wing nut) securing them is removed during wiring installation. Not only can this be frustrating, but it also introduces further safety and reliability issues should it result in one or more wires being connected incorrectly, or overlooked and not end up being connected at all.

Therefore, there is a need for an improved system for automatically applying the electric brakes of a towed vehicle in the event the towed vehicle becomes separated from a towing vehicle while being towed.

SUMMARY

The present disclosure is directed to an integrated system for engaging electric brakes of a towed vehicle when the towed vehicle separates from a towing vehicle. The integrated system, in various embodiments, may comprise a power source having a first pole and a second pole; a first junction pole configured to be connected with an electric ground and a second junction pole configured to be connected with the electric brakes of the towed vehicle; an electrical connector having a first end fixedly connected with the first junction pole and a second end fixedly connected with or configured to be connected with the second pole of the power source; a breakaway switch; and a housing containing the power source, the first junction pole, the second junction pole, and the electrical connector. The breakaway switch includes a first electrical connector fixedly connected with or configured to be connected with the first pole of the power source, and includes a second electrical connector fixedly connected with the second junction pole.

The towing vehicle, in an embodiment, may be an automobile, truck, or train locomotive, and the towed vehicle, in an embodiment, may be an automobile, truck, trailer, or train car. The power source, in an embodiment, may be a battery. The first pole of the battery, in an embodiment, may be a positive pole and the second pole of the battery may be a negative pole.

The first and second junction poles, in various embodiments, may be electrically connected to one another and may be fixedly connected with a multi-pin connector configured for connecting to a wiring loom of the towing vehicle. The system, in an embodiment, may further include at least one additional junction pole that may be fixedly connected with the multi-pin connector. One or more of the additional junction pole(s) may be configured for receiving electrical connectors associated with operation of signal light features of the towed vehicle.

The breakaway switch, in various embodiments, may be configured to complete an electrical circuit between the power source and the electric brakes of the towed vehicle upon separation of the towed vehicle from the towing vehicle. The electrical circuit, in an embodiment, may include the power source, the electric brakes, the electrical connector connecting the first junction pole with the second pole of the power source, the first electrical connector of the breakaway switch, and the second electrical connector of the breakaway switch. In an embodiment, the breakaway switch includes a mechanism coupled with the towing vehicle that may be configured to interrupt electrical communication between the first and second electrical connectors of the breakaway switch when inserted within the breakaway switch. The coupling, in an embodiment, may cause the mechanism to be removed from the breakaway switch such that the mechanism no longer interrupts electrical communication between the first and second electrical connectors of the breakaway switch, thereby completing the electrical circuit. The breakaway switch, in an embodiment, may be configured to be mounted on the towed vehicle.

Additionally or alternatively, the housing, in an embodiment, may be configured to be mounted on the towed vehicle. In an embodiment, the first electrical connector of the breakaway switch may be fixedly connected with the first pole of the power source, and the second end of the electrical connector connecting the first junction pole with the second pole of the power source may be fixedly connected with the second pole of the power source.

In another aspect, the present disclosure is directed to another integrated system for engaging electric brakes of a towed vehicle when the towed vehicle separates from a towing vehicle. The integrated system, in various embodiments, may include a power source having a first pole and a second pole; a first junction pole configured to be connected with an electric ground and a second junction pole configured to be connected with the electric brakes of the towed vehicle; an electrical connector having a first end fixedly connected with the first junction pole and a second end fixedly connected with the second pole of the power source; a breakaway switch; and a housing containing the power source, the first junction pole, the second junction pole, the electrical connector, and the breakaway switch. The breakaway switch may include a first electrical connector fixedly connected with the first pole of the power source, and a second electrical connector fixedly connected with the second junction pole.

The fixed connections of the system, in an embodiment, may minimize the number of required manual wiring connections for the system to operably engage the electric brakes of the towed vehicle when the towed vehicle separates from the towing vehicle. The housing, in an embodiment, may be configured to be mounted on the towed vehicle such that the entire system is configured to be mounted to the towed vehicle at a single mounting location.

DETAILED DESCRIPTION

Embodiments of the present disclosure are directed to an integrated breakaway brake system 100 configured for automatically applying the electric brakes of a towed vehicle in the event the towed vehicle becomes separated from a towing vehicle while being towed. As used herein, the term towed vehicle refers to a vehicle being towed and the term towing vehicle refers to a lead vehicle that is towing the towed vehicle. In various embodiments, a towing vehicle may include an automobile, truck, or train locomotive, and a towed vehicle may include another automobile or truck, or a trailer or train car. In a representative embodiment, the towing vehicle may be a truck and the towed vehicle may be a trailer. Integrated breakaway brake system 100 of the present disclosure features a physical and electrical architecture that can make it far simpler, easier, faster, and safer to both install and operate compared with traditional breakaway switch kits on the market today.

Figure 1:
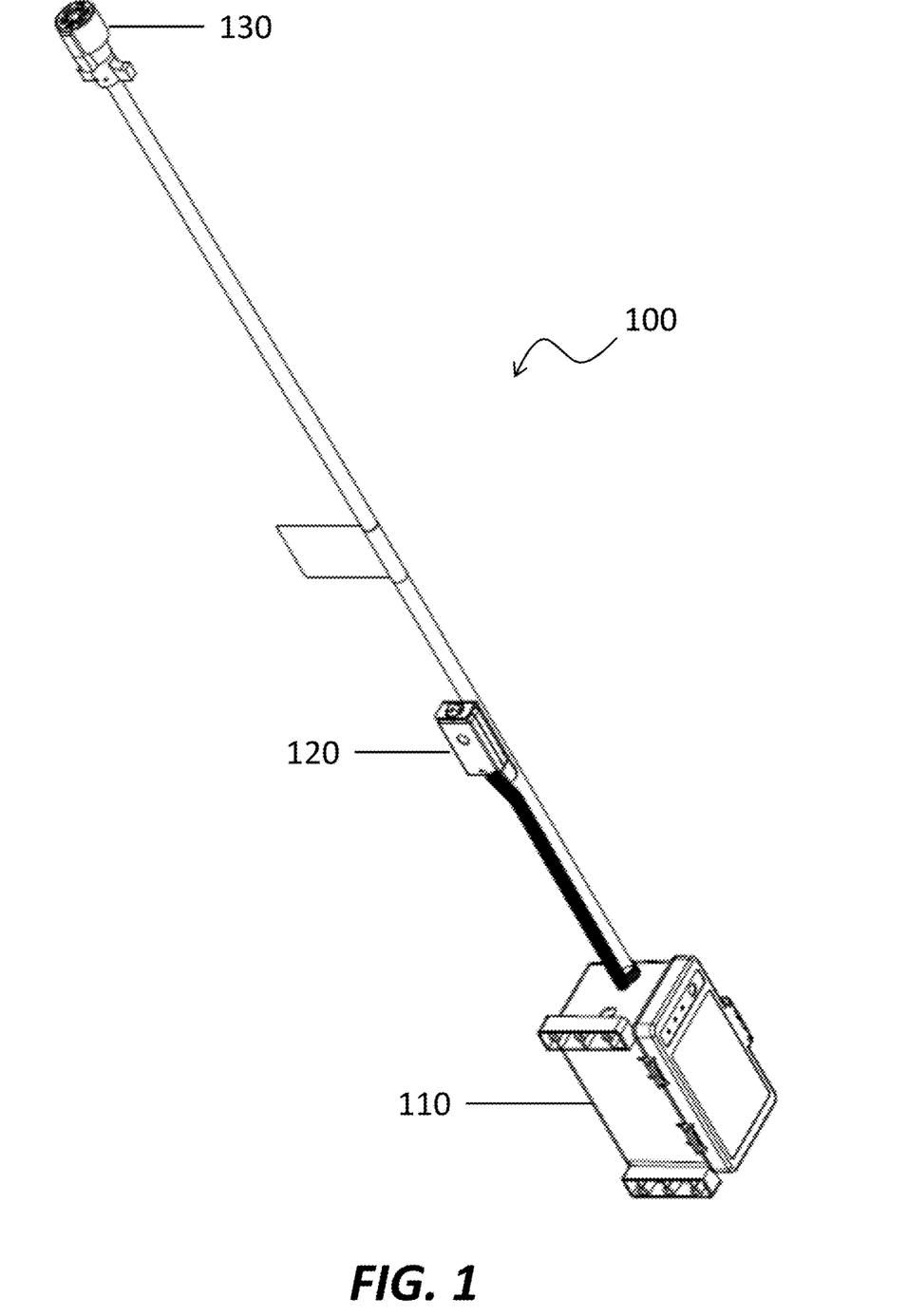
FIG. 1 depicts a perspective view of integrated breakaway brake system according to an embodiment of the present disclosure.
Figure 2A:
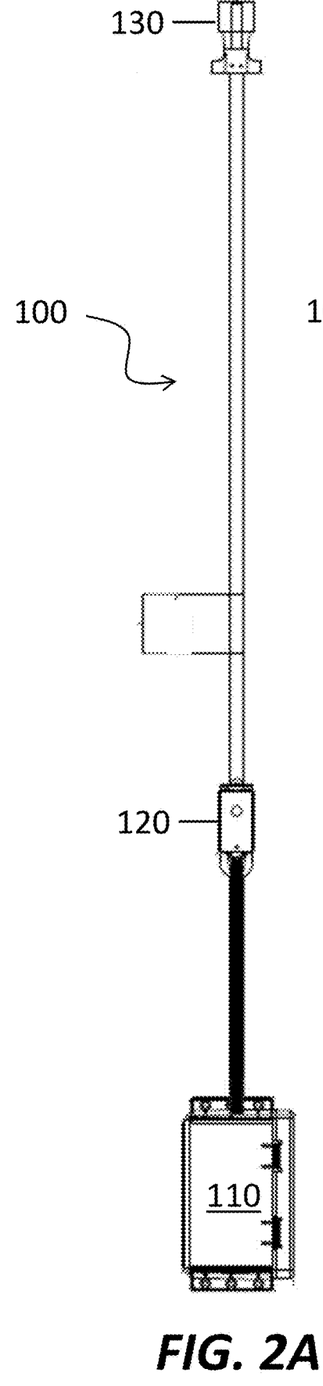
FIGS. 2A-2C depict a left side view, a top view, and a right side view, respectively, of the integrated breakaway brake system of FIG. 1.
Figure 2B:
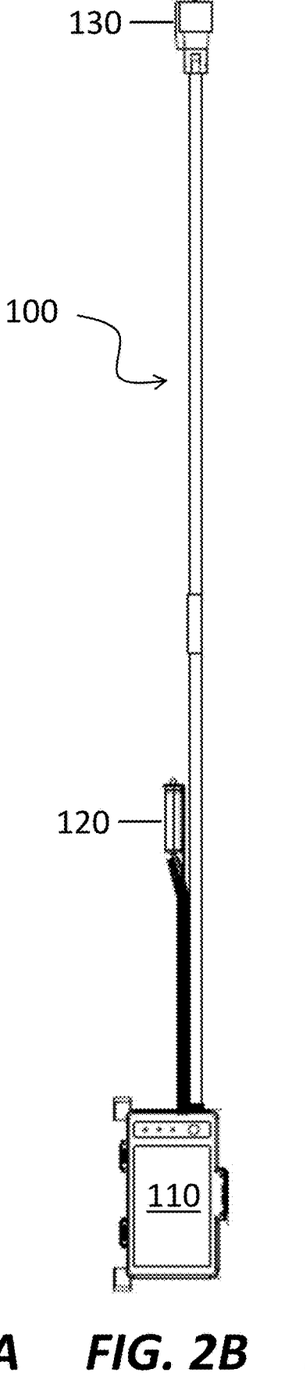
Figure 2C:
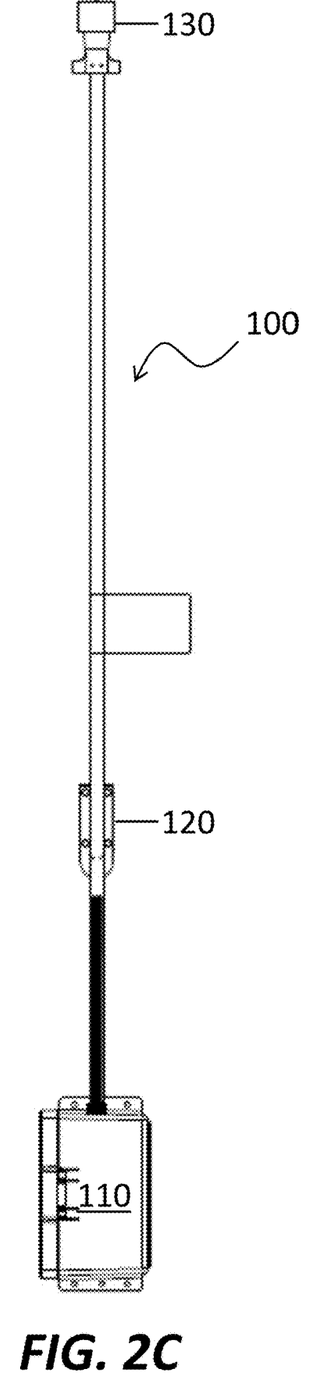

FIG. 1 depicts a perspective view of integrated breakaway brake system 100 according to an embodiment of the present disclosure. Integrated breakaway brake system 100 may generally comprise an electronics box 110, a breakaway switch 120, and a 7-way connector 130, as shown. In operation, electronics box 110 and breakaway switch 120 may be mounted on the towed vehicle and 7-way connector 130 plugged into a corresponding 7-way connector of the towing vehicle for receiving power and electronic signal commands from the towing vehicle. Wiring from the towed vehicle may be connected to electronics box 110 so as to receive power and commands from the towing vehicle. A cable or other connector can be attached to the towing vehicle and the breakaway switch such that, upon separation of the towed vehicle from the towing vehicle, the breakaway switch is triggered. This in turn causes a power source housed within electronics box 110 to be placed into electrical communication with the electronic brakes of the towed vehicle, thereby energizing the electronic brakes and slowing and/or stopping the towed vehicle. FIGS. 2A-2C depict a left side view, a top view, and a right side view, respectively, of this particular embodiment of integrated breakaway brake system 100.

Figure 3:
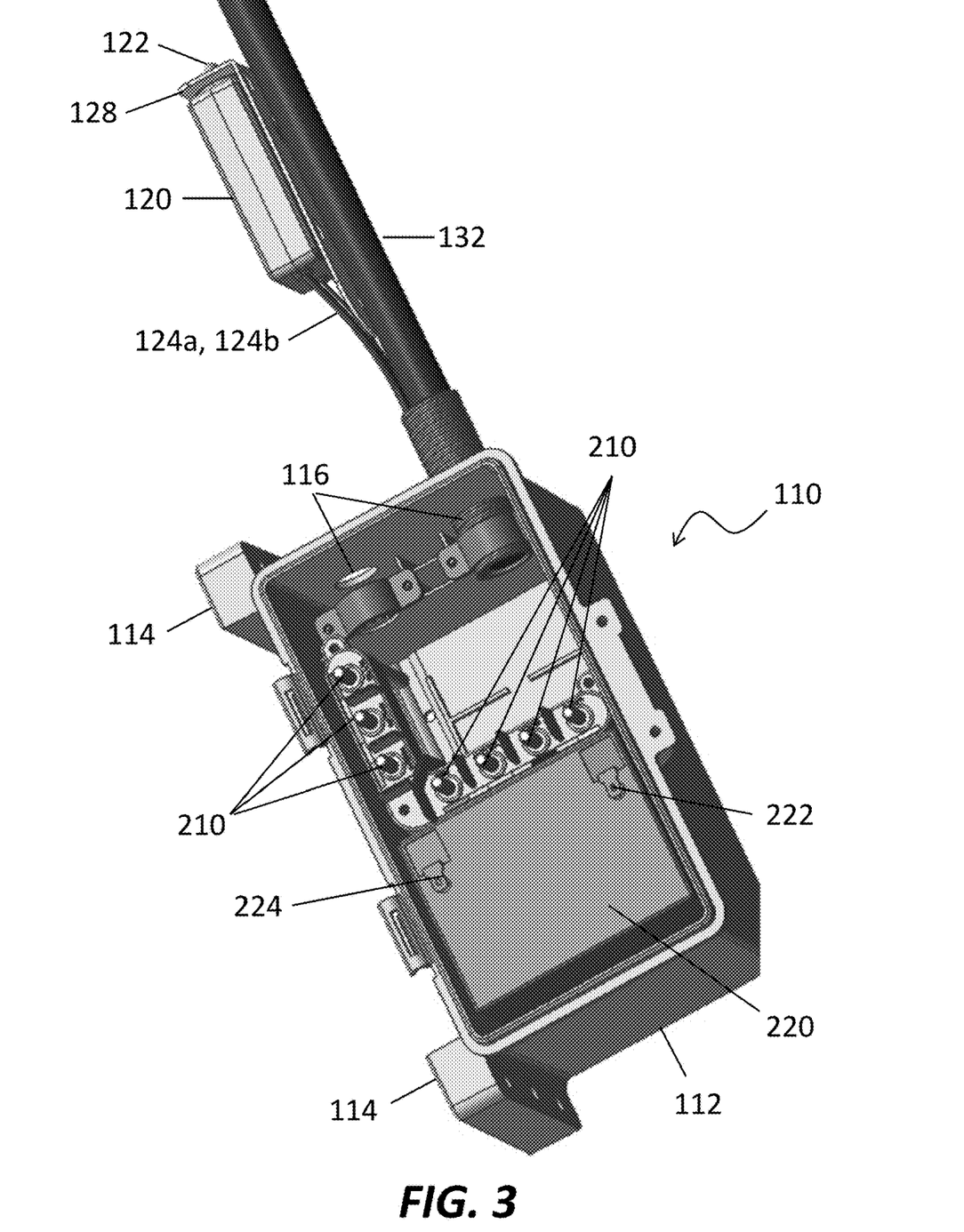
FIG. 3 depicts an internal view (lid removed) of an electronics box of integrated breakaway brake system according to an embodiment of the present disclosure.
Figure 6:
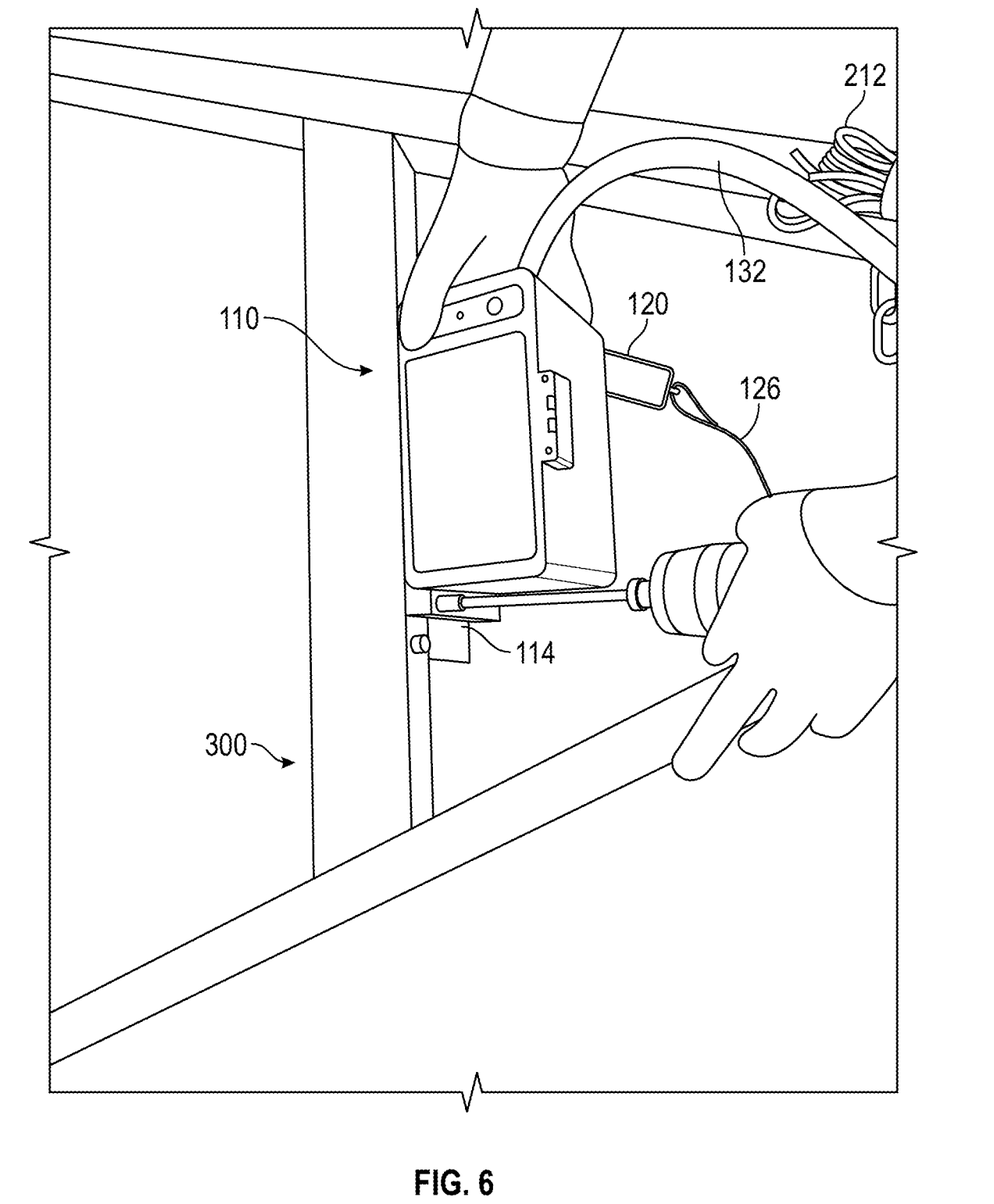
FIG. 6 depicts integrated breakaway brake system being installed on a trailer according to an embodiment of the present disclosure.

FIG. 3 depicts an internal view (lid removed) of electronics box 110 of integrated breakaway brake system 100 according to an embodiment of the present disclosure. As shown, electronics box 110 may include a housing 112 for housing a junction poles 210 and a power source 220 such as a battery. As later described with reference to FIG. 4B (not shown in FIG. 3), in an embodiment, housing 112 may further contain breakaway switch 120. Housing 112 may be configured with one or more mounts 114 for facilitating coupling of electronics box 110 with a towed vehicle (e.g., trailer, automobile, truck, train car) on which integrated breakaway brake system 100 is installed. In the present embodiment, housing 112 includes two mounts 114 configured with holes for receiving mounting screws or similar hardware as later shown in FIG. 6. Housing 112 may further include on or more ports 116—e.g., one for receiving a proximal end of tube 132 through which wires are routed for connecting junction poles 210 with 7-way connector 130, and one through which the towed vehicle wiring 212 (not shown, but later shown in FIG. 6) may be directed in and connected to junction poles 210. Brackets or other suitable couplers may be included for securing the proximal end of tube 132 within port 116, as shown.

Junction poles 210, in various embodiments, may include any commercially-available or custom hardware suitable for facilitating an electronic connection between electrical connectors associated with the towed vehicle (e.g., tail lights, electronic brakes, etc. as later shown in FIG. 4) and electrical connectors associated with the towing vehicle (e.g., outputs to the towed vehicle for activating tail lights, electronic brakes, etc.). As used herein, the term electrical connector means any electrically conductive element suitable for carrying electric signals or power such as wires, electrical contacts, soldered connections on printed control boards, and the like. As shown in FIG. 3, in an embodiment, junction poles 210 are similar to those found in commercially-available junction boxes.

Electrical connectors (e.g., wiring) from the towed vehicle may be placed into electrical communication with junction poles 210 using any suitable connector such as, without limitation, U-shaped connectors, ring-shaped connectors, bullet butt connectors, and the like. Of course, the bare end of a wire from the towed vehicle could also be wrapped around, inserted into, or otherwise coupled with a given junction pole 210 to similar effect. Similarly, electrical connectors (e.g., wiring) from the towing vehicle may be placed into electrical communication with junction poles 210. For example, in a representative embodiment, junction poles 210 may be wired into to a 7-way connector 130 (e.g., male) configured for interfacing with the towing vehicles wiring via a complementary 7-way connector (e.g., female). As configured, a user need only connect the towed vehicle wiring 212 to the appropriate junction poles 210 and plug 7-way connector 130 into the towing vehicle to complete the electronic connection between the towing vehicle and the towed vehicle. Notably, this also affords the user with flexibility to match the wiring of the towed vehicle with the desired outputs from the towing vehicle. This can be desirable when using system 100 with a towed vehicle having unconventional wiring or additional features that you would like to control via various outputs from the towing vehicle. For example, a user could leverage the flexibility of this architecture to connect and operate unconventional features of the towed vehicle, such as power outlets or interior lights, using desired outputs from the towing vehicle. Of course, any suitable configuration may be used so long as junction poles 210 act to place a given electrical connector from the towed vehicle (e.g., left turn signal) into electrical communication with a corresponding electrical connector from the towing vehicle (e.g., left turn signal control output).

Power source 220, in various embodiments, may include any commercially-available or custom power source suitable for powering the electronic brakes of the towed vehicle in the event the towed vehicle breaks away from the towing vehicle. In a representative embodiment, power source 220 is a battery, such as a 12 volt battery. Power source 220, in various embodiments, may include a first pole 222 (e.g., positive) and a second pole 224 (e.g., negative).

Electronics box 110, in an embodiment, may be configured as known in the art to route power from the towing vehicle to power source 220 for charging power source 220. In various embodiments, electronics box 110 may include a regulator (not shown) for controlling a voltage applied to power source 220 from the towing vehicle. Additionally or alternatively, electronics box 110 may be configured with lights for indicating a status of power source 220 (e.g., charged, low charge, charging, etc.). A test button may be included for checking these statuses.

Breakaway switch 120, in various embodiments, may include any commercially-available or custom breakaway switch for placing power source 220 into electronic communication with the electric brakes of the towed vehicle in the event the towed vehicle separates from the towing vehicle so that the electric brakes can slow down and/or stop the runaway towed vehicle. To this end, and with reference to FIGS. 3, 4A, and 4B, breakaway switch 120 may generally comprise a first electrical connector 124a in electrical communication with pole 222 of power source 220 and a second electrical connector 124b in electrical communication with the electric brakes of the towed vehicle (e.g., via corresponding junction pole 210g). Breakaway switch 120 may further include a mechanism 122 configured to prevent electrical communication between first and second electrical connectors 124a, 124b when the mechanism is inserted within breakaway switch 120. Mechanism 122 may be coupled to the towing vehicle via a cable or other suitable physical coupler (not shown) such that, upon separation of the towed vehicle from the towing vehicle, mechanism 122 is pulled out of or otherwise removed from breakaway switch 120 such that the mechanism no longer interrupts electrical communication between the first and second electrical connectors 124a, 124b, thereby placing pole 222 of power source 220 in electrical communication with the electric brakes of the towed vehicle. With the electric brakes and pole 224 of power source 220 grounded, the circuit is completed and the electric brakes are energized by power source 220 and thus engaged.

Referring back to FIG. 3, integrated breakaway brake system 100 may further include a coupler 128 for coupling breakaway switch 120 with either the towed vehicle (not shown) or tube 132 (shown). Coupler 128 is illustrated as a mounting bracket in the present embodiment; however, one of ordinary skill in the art will recognize that any other suitable coupler may be used to this effect.

Figure 4A:
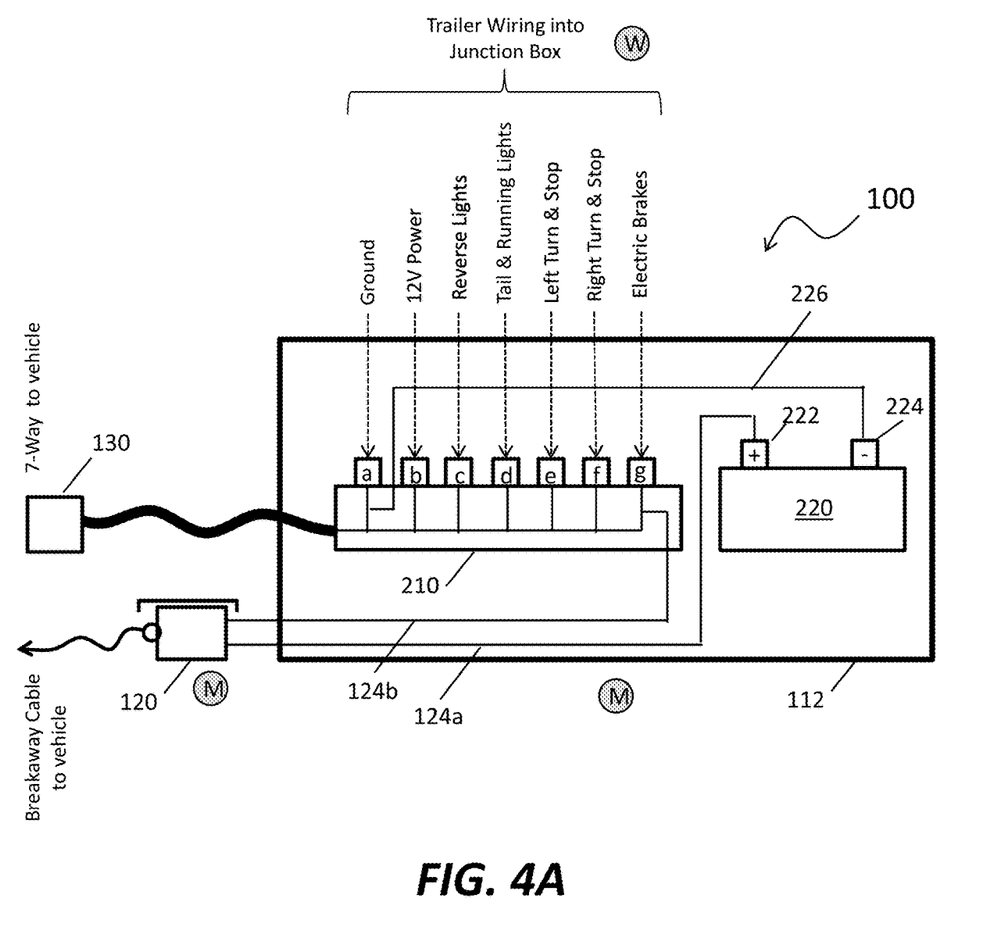
FIGS. 4A and 4B schematically depict representative electrical connections within and between various components of integrated breakaway brake system according to various embodiments of the present disclosure.
Figure 4B:
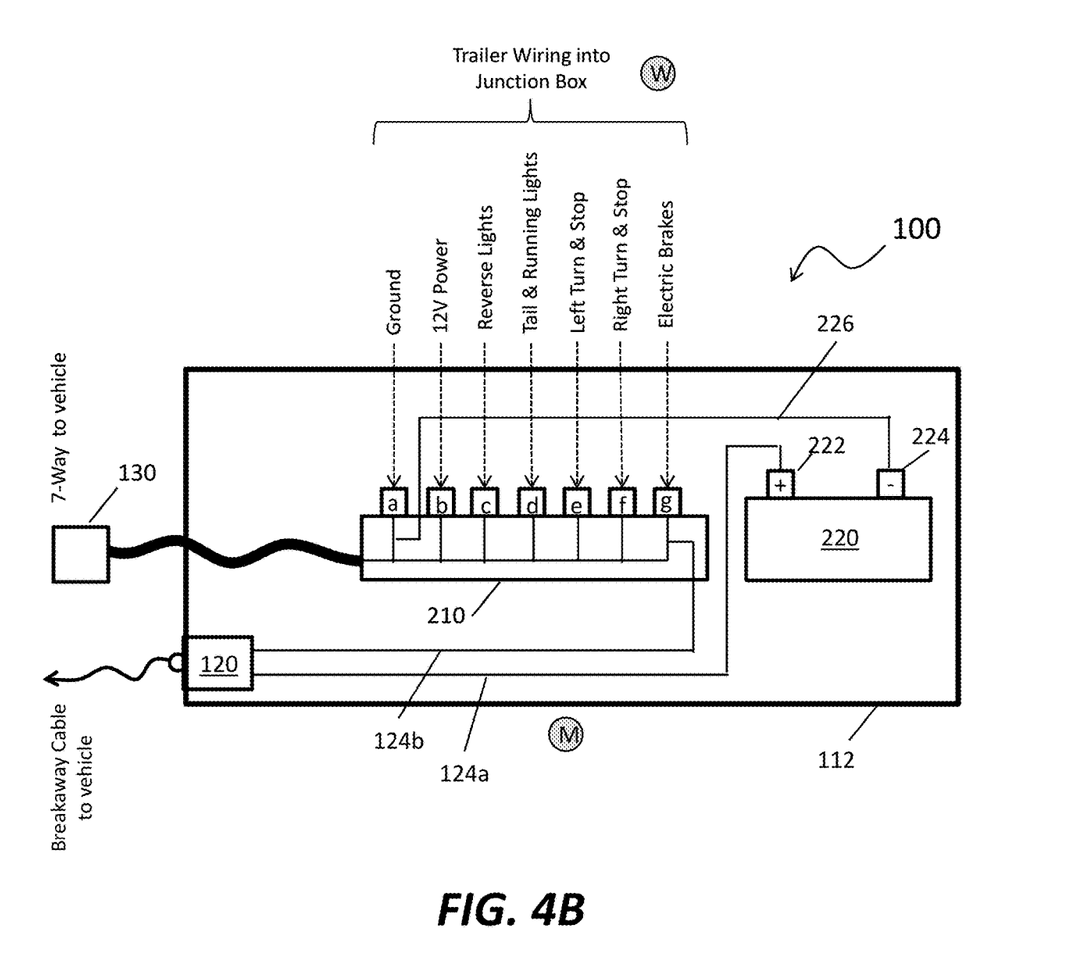

FIGS. 4A and 4B schematically depict representative electrical connections within and between various components of integrated breakaway brake system 100 according to various embodiments of the present disclosure. As used herein, for one electrical component to be "fixedly connected" with another electrical component (also referred to as "fixed connections") means that the particular electrical connection comes "pre-wired" such that a user of integrated breakaway brake system 100 does not need to make said electrical connection manually. For example, an electrical connector (e.g., wire) may be soldered to a junction pole 210 to form the fixed connection. As another example, an electrical connector (e.g., wire) may be soldered to an electrical contact positioned within housing to receive and contact the poles 222, 224 of power source 220 when power source 220 is situated in its designated location within housing 112. As configured, power source 220 can be replaced without the user having to manually connect the electrical connector to the corresponding pole of power source 220. Conversely, for one electrical component to be "configured to be connected" with another electrical component (also referred to as "manual connections") means that the particular electrical connection may require the user to manually connect the electrical components together. For example, a user may need to place a free end of an electrical connector (e.g., wire) in contact with a pole of power source 220 to form an electrical connection between the electrical components. The free end of the electrical connector could be removably secured to the pole of power source 220 to allow for the power source to be replaced. As another example, a user may need to place a free end of an electrical connector of the towed vehicle (e.g., electronic brake wire) in contact with a corresponding junction pole to form an electrical connection between these components. The free end of the electrical connector could be removably secured to the junction pole 210 to allow for the integrated breakaway brake system 100 to be used with other trailers.

FIG. 4A illustrates a representative embodiment in which breakaway switch 120 is not contained within housing 112. The solid lines represent fixed connections and the dashed lines represent manual connections made by the user during installation.

As shown, wiring from the towing vehicle (shown here as 7-way connector 130) is fixedly connected to the corresponding seven junction poles 210a-210g. Wiring from the towed vehicle can be configured to be connected to junction poles 210a-210g of integrated breakaway brake system 100. For example, ground wiring from the towed vehicle can be manually connected to junction pole 210a, wiring for providing power to the towed vehicle can be manually connected to junction pole 210b, towed vehicle reverse lights (white) can be manually connected to junction pole 210c, towed vehicle tail and running lights (red) can be manually connected to junction pole 210d, towed vehicle left turn lights (yellow) and stop lights (red) can be manually connected to junction pole 210e, towed vehicle right turn lights (yellow) and stop lights (red) can be manually connected to junction pole 210f, and towed vehicle electric brakes can be manually connected to junction pole 210g. It should be noted that towed vehicle wiring may vary from towed vehicle to towed vehicle, and that the particular towed vehicle wiring and junction pole configuration shown in FIG. 4A is merely illustrative.

First electrical connector 124a of breakaway switch 120 includes a first end fixedly connected with breakaway switch 120 and a second end that can be either fixedly connected with or configured to be connected with first pole 222 of power source 220. As configured, first pole 222 of power source 220 can be easily connected to breakaway switch 120, resulting in a simpler, faster, and more reliable installation of integrated breakaway brake system 100 on the towed vehicle.

Second electrical connector 124b of breakaway switch 120 includes a first end fixedly connected with breakaway switch 120 and a second end fixedly connected with junction pole 210g (electric brakes). As configured, a user does not need to splice into the towed vehicle wiring 212 associated with the electronic brakes, resulting in a simpler, faster, and more reliable installation of integrated breakaway brake system 100 on the towed vehicle.

Electrical connector 226 includes a first end fixedly connected with junction pole 210a (ground) and a second end either fixedly connected with or configured to be connected with second pole 224 of power source 220. As configured, second pole 222 of power source 220 and ground wiring from the towed vehicle can be easily connected to an electric ground (or to each other), resulting in a simpler, faster, and more reliable installation of integrated breakaway brake system 100 on the towed vehicle.

In the event the towed vehicle breaks away from the towing vehicle, breakaway switch 120 will close the circuit between power source 220 and the towed vehicle electric brakes thereby providing emergency power to slow and/or stop the towed vehicle.

FIG. 4B illustrates a representative embodiment in which breakaway switch 120 is contained within housing 112. The solid lines represent fixed connections and the dashed lines represent manual connections made by the user during installation.

As shown, wiring from the towing vehicle (shown here as 7-way connector 130) is fixedly connected to the corresponding seven junction poles 210a-210g. Wiring from the towed vehicle can be configured to be connected to junction poles 210a-210g of integrated breakaway brake system 100. For example, ground wiring from the towed vehicle can be manually connected to junction pole 210a, wiring for providing power to the towed vehicle can be manually connected to junction pole 210b, towed vehicle reverse lights (white) can be manually connected to junction pole 210c, towed vehicle tail and running lights (red) can be manually connected to junction pole 210d, towed vehicle left turn lights (yellow) and stop lights (red) can be manually connected to junction pole 210e, towed vehicle right turn lights (yellow) and stop lights (red) can be manually connected to junction pole 210f, and towed vehicle electric brakes can be manually connected to junction pole 210g. It should be noted that towed vehicle wiring may vary from towed vehicle to towed vehicle, and that the particular towed vehicle wiring and junction pole configuration shown in FIG. 4B is merely illustrative.

First electrical connector 124a of breakaway switch 120 includes a first end fixedly connected with breakaway switch 120 and a second end that can be either fixedly connected with or configured to be connected with first pole 222 of power source 220. As configured, first pole 222 of power source 220 can be easily connected to breakaway switch 120, resulting in a simpler, faster, and more reliable installation of integrated breakaway brake system 100 on the towed vehicle.

Second electrical connector 124b of breakaway switch 120 includes a first end fixedly connected with breakaway switch 120 and a second end fixedly connected with junction pole 210g (electric brakes). As configured, a user does not need to splice into the towed vehicle wiring 212 associated with the electronic brakes, resulting in a simpler, faster, and more reliable installation of integrated breakaway brake system 100 on the towed vehicle.

Electrical connector 226 includes a first end fixedly connected with junction pole 210a (ground) and a second end either fixedly connected with or configured to be connected with second pole 224 of power source 220. As configured, second pole 222 of power source 220 and ground wiring from the towed vehicle can be easily connected to an electric ground (or to each other), resulting in a simpler, faster, and more reliable installation of integrated breakaway brake system 100 on the towed vehicle.

In the event the towed vehicle breaks away from the towing vehicle, breakaway switch 120 will close the circuit between power source 220 and the towed vehicle electric brakes thereby providing emergency power to slow and/or stop the towed vehicle.

Notably, integrated breakaway switch 100 of the present disclosure advantageously reduces the amount of labor and know-how required for proper installation relative to ordinary breakaway kits known in the art, and further improves reliability and safety as previously described. FIGS. 4A and 4B further illustrates these benefit as compared to an ordinary breakaway kit shown in FIG. 5. In FIG. 4A, note that junction poles 210 and power source 220 of integrated breakaway brake system 100 come housed within housing 112 of electronics box 110. As configured, there are only two components to mount to the towed vehicle (i.e., electronics box 110 and breakaway switch 120) as indicated by the circled "M" symbols, and only one manual wiring task to be performed by the user (i.e., connecting the towed vehicle wiring 212 to the junction poles 210), as indicated by the circled "W" symbol. In FIG. 4B, note that junction poles 210, power source 220, and breakaway switch 120 of integrated breakaway brake system 100 come housed within housing 112 of electronics box 110. As configured, there is only one component to mount to the towed vehicle (i.e., electronics box 110) as indicated by the circled "M" symbol, and only one manual wiring task to be performed by the user (i.e., connecting the towed vehicle wiring 212 to the junction poles 210), as indicated by the circled "W" symbol.

Figure 5:
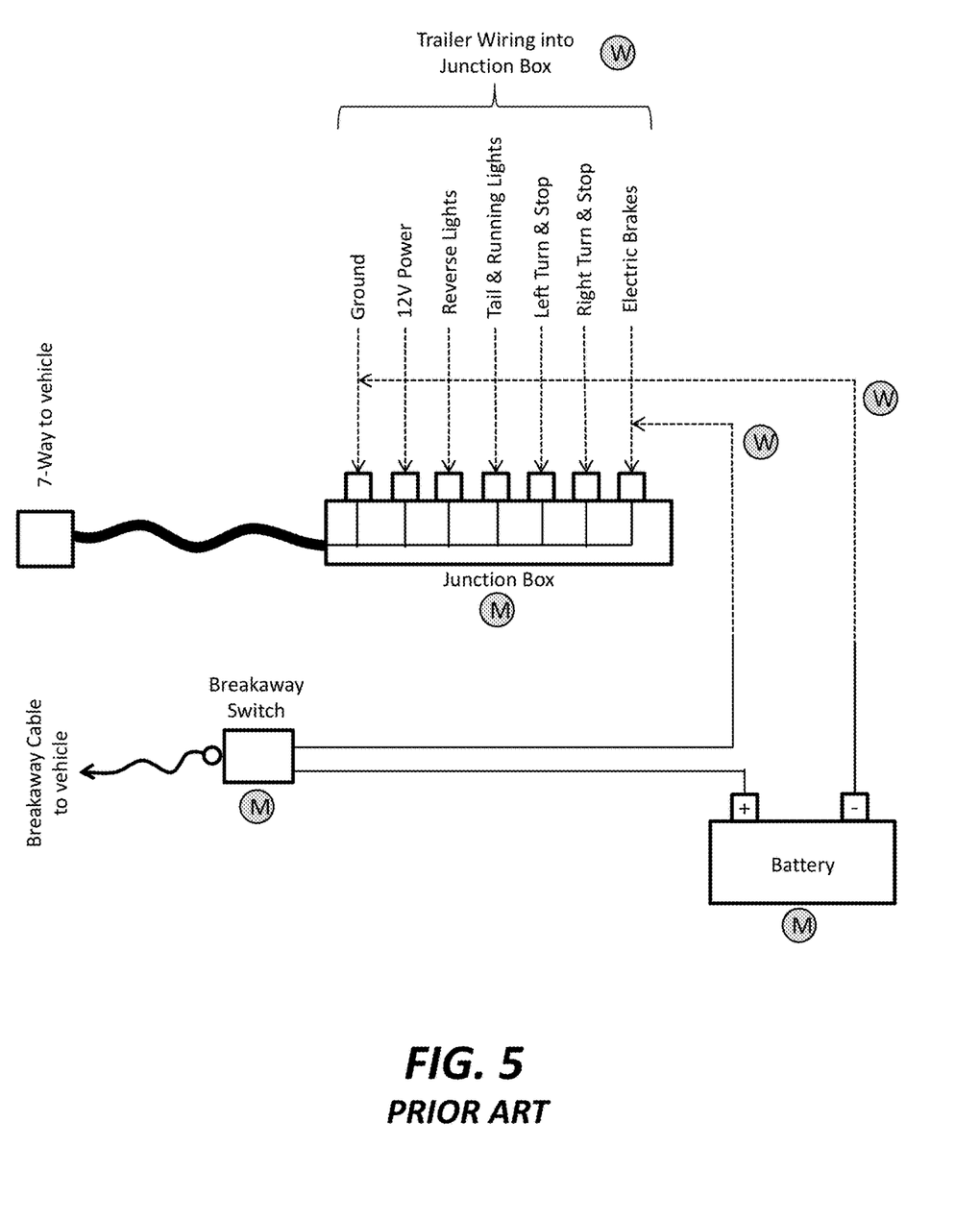
FIG. 5 schematically depicts a traditional, multi-piece breakaway kit known in the art.

Conversely, as shown in FIG. 5, an ordinary breakaway kit traditionally comes in pieces that must be separately mounted to the towed vehicle and that require additional manual wiring tasks by the user. In particular, as shown by the circled "M" symbols, there are typically at least three separate mounting tasks to perform—that is, mounting the junction box to the towed vehicle, mounting the power source to the towed vehicle, and mounting the breakaway switch to the towed vehicle (if it is not left to dangle, which in and of itself introduces reliability and safety issues previously discussed). Similarly, as shown by the circled "W" symbols, there are typically at least three separate manual wiring tasks—that is, connecting the towed vehicle wiring 212 to the junction box, connecting the breakaway switch to the electric brakes wiring, and connecting the power source to an electric ground. Notably, these three wiring tasks can be complicated, thereby increasing the time and difficulty of installation, as well as introducing potential safety and reliability issues. Some traditional breakaway kits do not include junction boxes, and thus it is necessary to splice the connections between: 1) the 7-way wiring and the towed vehicle wiring, 2) the breakaway switch and the electric brake wiring from the towed vehicle, and 3) the power source and the 7-way ground (or other ground). Those traditional breakaway kits that do include a junction box still require a user to either splice the wires from the breakaway switch and the power source into the towed vehicle wiring (as shown in FIG. 5), or to attach these wires to the corresponding poles (e.g., the poles corresponding to electric brakes and ground, respectively) of the junction box. User error in making these connections could lead to the breakaway kit not functioning as intended, as well as the potential for creating a short circuit or other effect that damages or destroys the breakaway kit and/or the power source. Further, it can be cumbersome to make these connections to the junction box, as these wires or wires from the towed vehicle can tend to jump off of the poles when the fastener (e.g., wing nut) securing them to the poles is removed during wiring installation. Not only can this be frustrating, but it also introduces further safety and reliability issues should it result in one or more wires being connected to the wrong pole, or overlooked and not end up being connected at all. These concerns are obviated by the integrated design of integrated breakaway brake system 100 of the present disclosure.

While the presently disclosed embodiments have been described with reference to certain embodiments thereof, it should be understood by those skilled in the art that various changes may be made and equivalents may be substituted without departing from the true spirit and scope of the presently disclosed embodiments. In addition, many modifications may be made to adapt to a particular situation, indication, material and composition of matter, process step or steps, without departing from the spirit and scope of the present presently disclosed embodiments. All such modifications are intended to be within the scope of the claims appended hereto.

What is claimed is:

1. An integrated system for engaging electric brakes of a towed vehicle when the towed vehicle separates from a towing vehicle, the system comprising:
    a housing;
    a power source having a first pole and a second pole;
    a first junction pole configured to be connected with an electric ground and a second junction pole configured to be connected with the electric brakes of the towed vehicle;
    an electrical connector having a first end soldered to the first junction pole and a second end that is either soldered to the second pole of the power source, soldered to an electrical contact within the housing to receive and contact the second pole of the power source when the power source is situated in a designated location within the housing, or configured to be connected with the second pole of the power source; and
    a breakaway switch,
    wherein the housing contains the power source, the first junction pole, the second junction pole, and the electrical connector,
    wherein the breakaway switch includes a first electrical connector that is either soldered to the first pole of the power source, soldered to an electrical contact within the housing to receive and contact the first pole of the power source when the power source is situated in a designated location within the housing, or configured to be connected with the first pole of the power source
    wherein the breakaway switch includes a second electrical connector soldered to the second junction pole, and
    wherein the second junction pole comprises an electrically conductive structure configured to removably secure a free end of an electrical connector of the electric brakes and thereby facilitate an electrical connection between the second electrical connector of the breakaway switch and the electrical connector of the electric brakes.

2. The integrated system of claim 1, wherein the towing vehicle is an automobile, truck, or train locomotive.

3. The integrated system of claim 1, wherein the towed vehicle is an automobile, truck, trailer, or train car.

4. The integrated system of claim 1, wherein the power source is a battery.

5. The integrated system of claim 4, wherein the first pole of the battery is a positive pole and the second pole of the battery is a negative pole.

6. The integrated system of claim 1, wherein the first and second junction poles are electrically connected to one another.

7. The integrated system of claim 6, wherein the first and second junction poles are fixedly connected with a multi-pin connector configured for connecting to a wiring loom of the towing vehicle.

8. The integrated system of claim 7,
    further including at least one additional junction pole,
    wherein the at least one additional junction pole is fixedly connected with the multi-pin connector, and
    wherein one or more of the at least one additional junction poles are configured for receiving electrical connectors associated with operation of signal light features of the towed vehicle.

9. The integrated system of claim 8, wherein one or more of the at least one additional junction poles are configured for receiving electrical connectors associated with at least one of interior light features and electrical outlets of the towed vehicle.

10. The integrated system of claim 1, wherein the breakaway switch is configured to complete an electrical circuit between the power source and the electric brakes of the towed vehicle upon separation of the towed vehicle from the towing vehicle.

11. The integrated system of claim 10, wherein the electrical circuit comprises the power source, the electric brakes, the electrical connector connecting the first junction pole with the second pole of the power source, the first electrical connector of the breakaway switch, and the second electrical connector of the breakaway switch.

12. The integrated system of claim 10,
    wherein the breakaway switch includes a mechanism configured to interrupt electrical communication between the first and second electrical connectors of the breakaway switch when inserted within the breakaway switch,
    wherein the mechanism is coupled with the towing vehicle, and
    wherein the coupling causes the mechanism to be removed from the breakaway switch such that the mechanism no longer interrupts electrical communication between the first and second electrical connectors of the breakaway switch, thereby completing the electrical circuit.

13. The integrated system of claim 1, wherein the breakaway switch is configured to be mounted on the towed vehicle.

14. The integrated system of claim 1, wherein the housing is configured to be mounted on the towed vehicle.

15. The integrated system of claim 1, wherein at least one of:
    the first electrical connector of the breakaway switch is either soldered to the first pole of the power source or soldered to an electrical contact within the housing to receive and contact the first pole of the power source when the power source is situated in a designated location within the housing, and
    the second end of the electrical connector connecting the first junction pole with the second pole of the power source is either soldered to the second pole of the power source or soldered to an electrical contact within the housing to receive and contact the second pole of the power source when the power source is situated in a designated location within the housing.

16. The integrated system of claim 1, further comprising a connector for releasably securing the free end of the electrical connector of the electric brakes to the second junction pole.

17. The integrated system of claim 16, wherein the connector is a U-shaped connector, ring-shaped connector, or a bullet butt connector.

18. The integrated system of claim 1, wherein the second junction pole is configured to releasably secure the free end of the electrical connector of the electric brakes by wrapping the free end around the second junction pole or by inserting the free end into the second junction pole.

19. The integrated system of claim 1, wherein the first junction pole comprises an electrically conductive structure configured to removably secure a free end of an electrical connector of the electric ground and thereby facilitate an electrical connection between the second pole of the power source and the electrical connector of the electric ground.

20. An integrated system for engaging electric brakes of a towed vehicle when the towed vehicle separates from a towing vehicle, the system comprising:
 a housing;
 a power source having a first pole and a second pole;
 a first junction pole configured to be connected with an electric ground and a second junction pole configured to be connected with the electric brakes of the towed vehicle;
 an electrical connector having a first end soldered to the first junction pole and a second end that is either soldered to the second pole of the power source or soldered to an electrical contact within the housing to receive and contact the second pole of the power source when the power source is situated in a designated location within the housing; and
 a breakaway switch,
 wherein the housing contains the power source, the first junction pole, the second junction pole, the electrical connector, and the breakaway switch,
 wherein the breakaway switch includes a first electrical connector that is either soldered to the first pole of the power source or soldered to an electrical contact within the housing to receive and contact the first pole of the power source when the power source is situated in a designated location within the housing,
 wherein the breakaway switch includes a second electrical connector soldered to the second junction pole, and
 wherein the second junction pole comprises an electrically conductive structure configured to removably secure a free end of an electrical connector of the electric brakes and thereby facilitate an electrical connection between the second electrical connector of the breakaway switch and the electrical connector of the electric brakes.

21. The integrated system of claim 20, wherein a user is required to perform only the following manual wiring connections for the system to operably engage the electric brakes of the towed vehicle when the towed vehicle separates from the towing vehicle: (i) connecting the electric brakes of the towed vehicle to the second junction pole, and (ii) connecting the ground to the first junction pole.

22. The integrated system of claim 20, wherein the housing is configured to be mounted on the towed vehicle such that the entire system is configured to be mounted to the towed vehicle at a single mounting location.

23. The integrated system of claim 20, wherein the towing vehicle is an automobile, truck, or train locomotive.

24. The integrated system of claim 20, wherein the towed vehicle is an automobile, truck, trailer, or train car.

25. The integrated system of claim 20, further comprising a connector for releasably securing the free end of the electrical connector of the electric brakes to the second junction pole.

26. The integrated system of claim 25, wherein the connector is a U-shaped connector, ring-shaped connector, or a bullet butt connector.

27. The integrated system of claim 20, wherein the second junction pole is configured to releasably secure the free end of the electrical connector of the electric brakes by wrapping the free end around the second junction pole or by inserting the free end into the second junction pole.

28. The integrated system of claim 20, wherein the first junction pole comprises an electrically conductive structure configured to removably secure a free end of an electrical connector of the electric ground and thereby facilitate an electrical connection between the second pole of the power source and the electrical connector of the electric ground.

* * * * *